United States Patent

[11] 3,608,746

| [72] | Inventor | Alfred Meyer<br>Hasbergen, Germany |
|---|---|---|
| [21] | Appl. No. | 26,517 |
| [22] | Filed | Apr. 8, 1970 |
| [45] | Patented | Sept. 28, 1971 |
| [73] | Assignee | C. Keller u. Co.<br>Laggenbeck am Westfalia, Germany |
| [32] | Priority | Apr. 9, 1969 |
| [33] | | Germany |
| [31] | | P 19 18 017.7.-22 |

[54] APPARATUS FOR STACKING BRICKS AND OTHER ARTICLES
5 Claims, 2 Drawing Figs.

[52] U.S. Cl........................................................ 214/6 A,
 214/6 H
[51] Int. Cl......................................................... B65g 57/22
[50] Field of Search............................................ 214/6 A, 6
 P, 6, 6 M, 6 FS

[56] References Cited
UNITED STATES PATENTS
3,388,815  6/1968  Lingl...........................  214/6 A

*Primary Examiner*—Gerald M. Forlenza
*Assistant Examiner*—Robert J. Spar
*Attorney*—Mason, Mason & Albright

ABSTRACT: Apparatus for stacking bricks and other articles comprises a series of conveyors and gripper devices for transferring individual layers from one conveyor to another. To avoid delays a dual path is provided over part of the apparatus. A table receives the layers from both paths alternately and a stack is delivered from the table to a fixed support base and thence to a take away conveyor.

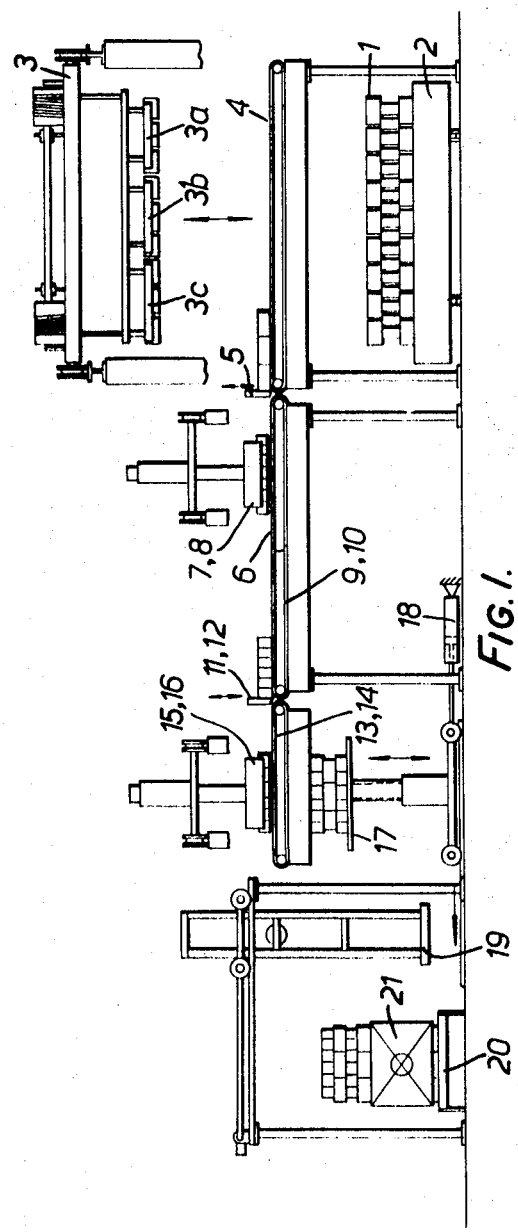

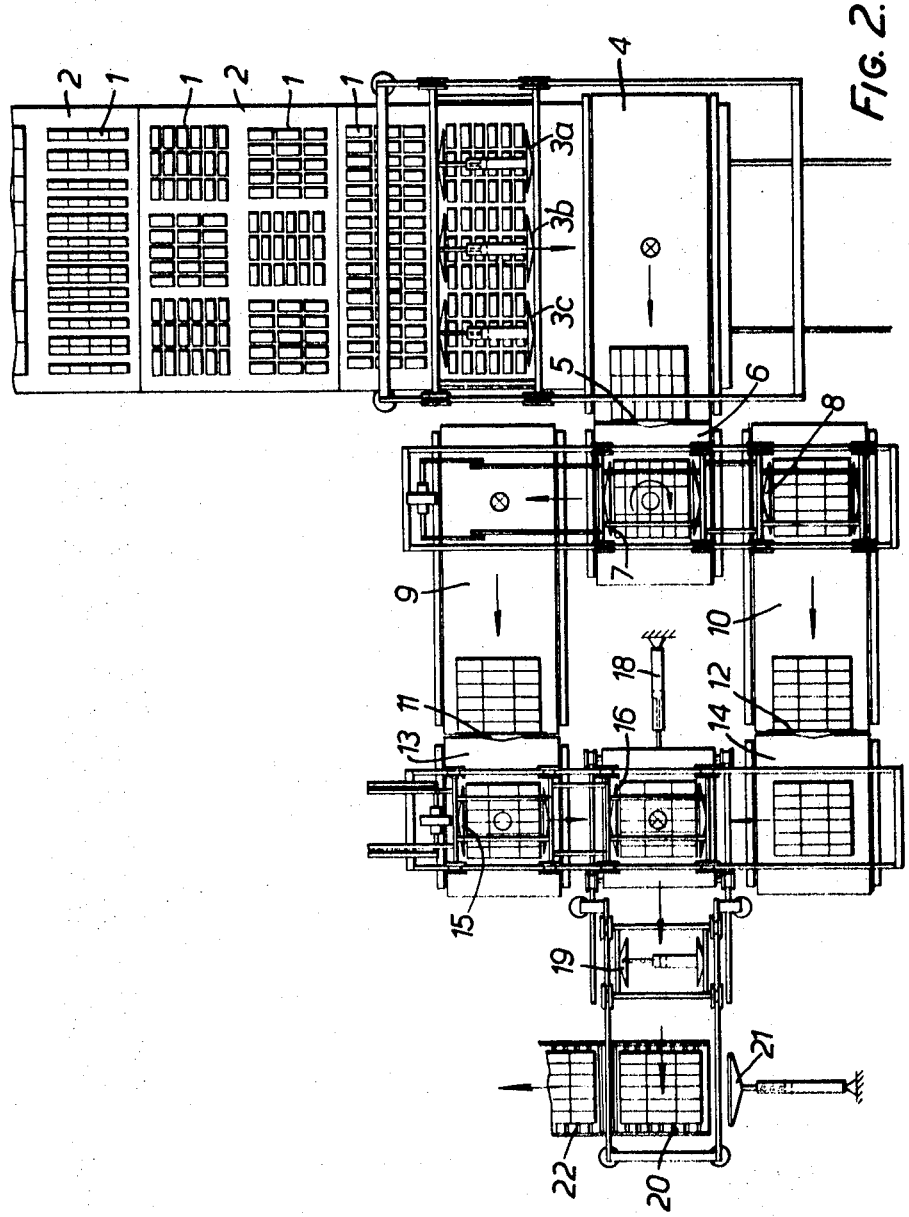

APPARATUS FOR STACKING BRICKS AND OTHER ARTICLES

BACKGROUND OF THE INVENTION

1. Field of the Invention

This invention relates to a system of and apparatus for stacking bricks, tiles and other articles in layers.

2. Summary of the Prior Art

U.S. Pat. No. 3,392,851 teaches a machine for stacking bricks in layers with the aid of a gripper that can be moved horizontally and vertically for picking up bricks in layers from a conveyor belt fitted with an end stop and for depositing them on a table that sinks layer by layer, as well as a conveyor belt on which the stacks, fed on by a transverse thrust member, are taken to a banding machine.

German Utility Model Specification No. 6,751,347 teaches details of apparatus for placing stacks of moulded articles, in which two adjacent conveyor belts are arranged between two transfer grippers.

One object of the present invention is to increase the output of such apparatus by ensuring that the stacking and the conveying of the stacks to a banding machine take place as far as possible without interrupting the flow of the work.

SUMMARY OF THE INVENTION

According to the present invention there is provided apparatus for stacking articles in layers comprising a first conveyor, first gripper means for delivering the articles as compact layers on to the first conveyor, which articles have been received in loose but regular batches, said first gripper means being movable vertically and horizontally, second and third gripper means for onward conveyance of the compact layers parallel to the horizontal direction of movement of the first gripper means, both said second and third gripper means being movable vertically and being rotatable about a respective vertical axis, said second and third gripper means being disposed to take up compacted layers from the first conveyor, second and third conveyors arranged to receive selectively compact layers from the second and third gripper means, said second and third conveyors running parallel to the first conveyor and being spaced horizontally from one another, two retractable stop means, one said stop means being disposed for cooperation with a layer on the second conveyor and the other stop means being disposed for cooperation with a layer on the third conveyor whereby layers of articles on these conveyors can be compacted, fourth and fifth conveyors arranged to receive layers of articles respectively from the second and third conveyors, fourth and fifth gripper means each movable vertically and being rotatable about a respective vertical axis, table means for receiving selectively layers from the fourth and fifth conveyors by means of said fourth and fifth gripper means, said table means being capable of supporting a stack built up from the said layers, a fixed support base, a transfer mechanism for transferring a completed stack from the table means on to the fixed support base, a transverse thrust means, and a sixth conveyor, said transverse thrust means serving to transfer a stack on said fixed support base on to the sixth conveyor.

BRIEF DESCRIPTION OF THE DRAWINGS

The invention will now be described, by way of example, with reference to the accompanying diagrammatic drawings, in which:

FIG. 1 is a view of the apparatus in accordance with the invention; and

FIG. 2 is a plan corresponding to FIG. 1.

Loose kiln stacks of bricks, tiles or other articles 1 are pushed by a kiln trolley 2 to an initial position, where the individual layers of bricks or tiles are removed layer by layer by a gripper device 3, (first gripper means) which can move horizontally and vertically, and deposited on a base such as a conveyor belt 4, (first conveyor means) which travels horizontally.

In the embodiment described and shown, the gripper device consists of several individual gripper devices, 3a, 3b and 3c.

A retractable stop 5 serves to contact each layer as it is displaced thereby producing a compacted layer.

After the compacted layer has been squared up, the stop 5 is raised, enabling the conveyor belt 4 to transfer the layer to another conveyor belt 46 (a further part of the first conveyor means). The layer on the belt 6 is then transferred by either one of two interconnected gripper devices 7 and 8, (second and third gripper means) which can be raised and lowered and rotated about a vertical axis, on to one or other of two conveyor belts 9 and 10, (second and third conveyor means) which extend side by side but also spaced from one another.

The mode of operation of the two interconnected gripper devices 7 and 8 is such that one of them, 7, for example, grips the layer situated on the conveyor belt 6 and deposits it on the conveyor belt 9. In that position, the gripper device 8 lies above the belt 6 and takes up the layer lying thereon. During the return movement of the two gripper devices 7 and 8, the device 8 comes within range of the belt 10, on which it deposits the layer, while the gripper device 7 is now within range of the belt 6 and can thus take up the layer lying on that belt. Rotation of the two gripper devices 7 and 8 about the vertical axis will be necessary when the layer received comes to lie on the conveyor belt 6 with the narrow face of the individual bricks at right angles to the direction of motion of the belt 6 and it is desired to obtain a position for the layer on both the belts 9 and 10 in which the wide face of the individual bricks lies at right angles to the direction of motion of the belts 9 and 10.

Retractable stops 11 and 12, which can be raised and lowered, are provided at the respective ends of both belts 9 and 10, for the purpose of squaring up and recompacting, if necessary, the layers deposited on those belts.

After the squaring up step, that is to say when the two stops 11 and 12 have been moved to the inoperative position, the conveyor belts 9 and 10 move their corresponding layers on to two further conveyor belts 13 and 14 (fourth and fifth conveyor means). The layers transferred to these two belts 13 and 14 are now placed, by two interconnected gripper devices 15 and 16, (fourth and fifth gripper means) which can be raised and lowered and rotated about a vertical axis, on to a table 17, to form a stack layer by layer.

The mode of operation of these two gripper devices 15 and 16 is similar to that of the two gripper devices 7 and 8, except that the gripper devices 15 and 16 serve to combine the layers lying on the belts 13 and 14 into a compact stack on the table 17, whereas the purpose of the gripper devices 7 and 8 is to distribute to the belts 9 and 10 the layers arriving in a predetermined time sequence on the belt 6.

The table 17 is lowered a layer at a time, so that the topmost layer always come to lie in the same plane. Upon completion of the stacking step, the table 17 is moved by a pressure-operated cylinder or other appropriate means into the reach of a transfer mechanism 19, by which the stack is deposited as a whole on to a fixed support base 20. The empty table 17 is thereupon returned to its loading position.

A transverse thrust member 21, then pushes the stack off the fixed base 20 on to a moving base such as a conveyor belt 22, (sixth conveyor means) which carries the individual stacks one after another to a banding machine, where banding is carried out by conventional means.

I claim:

1. Apparatus for stacking articles in layers comprising
a first conveyor,
first gripper means for delivering the articles as compact layers on to the first conveyor, which articles have been received in loose but regular batches, said first gripper means being movable vertically and horizontally,
second and third gripper means for onward conveyance of the compact layers parallel to the horizontal direction of movement of the first gripper means, both said second and third gripper means being movable vertically and being rotatable about a respective vertical axis, said second and third gripper means being disposed to take up compacted layers from the first conveyor, second and third conveyors arranged to receive selectively compact layers from the second and third gripper means, said second and third conveyors running parallel to the first conveyor and being spaced horizontally from one another, two retractable stop means, one said stop means being disposed for cooperation with a layer on the second conveyor and the other stop means being disposed for cooperation with a layer on the third conveyor whereby layers of articles on these conveyors can be compacted, fourth and fifth conveyors arranged to receive layers of articles respectively from the second and third conveyors, fourth and fifth gripper means each movable vertically and being rotatable about a respective vertical axis, table means for receiving selectively layers from the fourth and fifth conveyors by means of said fourth and fifth gripper means, said table means being capable of supporting a stack built up from the said layers, a fixed support base, a transfer mechanism for transferring a completed stack from the table means on to the fixed support base, transverse thrust means, and a sixth conveyor, said transverse thrust means serving to transfer a stack on said fixed support base on to the sixth conveyor.

2. Apparatus according to claim 1, wherein said first gripper means comprises a plurality of separate gripper devices.

3. Apparatus according to claim 1, comprising
a pressure-fluid actuator for moving the table means.

4. Apparatus according to claim 1, comprising
retractable stop means adjacent the end of the first conveyor.

5. Apparatus according to claim 4, wherein each said retractable stop means is disposed adjacent the end of the associated said conveyor.